United States Patent [19]

Greenlee

[11] 3,754,967

[45] Aug. 28, 1973

[54] METHOD OF ADHERING SILICONE RUBBER TO METAL SURFACES USING SALTS

[75] Inventor: Thomas W. Greenlee, Midland, Mich.

[73] Assignee: Dow Corning Corporation, Midland, Mich.

[22] Filed: June 18, 1971

[21] Appl. No.: 154,645

[52] U.S. Cl. .............................. 117/49, 117/132 BS
[51] Int. Cl. ..................... B44d 1/40, B32b 15/08
[58] Field of Search .................... 117/49, 132 BS; 156/3; 134/2, 3, 4, 40, 41; 252/79.1

[56] References Cited
UNITED STATES PATENTS

| | | | |
|---|---|---|---|
| 3,591,432 | 7/1971 | Vazirani | 117/49 X |
| 3,166,444 | 1/1965 | Ehren et al. | 134/3 |
| 2,607,739 | 8/1952 | De Long | 134/41 X |
| 3,065,194 | 11/1962 | Nitzsche et al. | 260/37 |
| 2,999,077 | 9/1961 | Nitzche et al. | 260/18 |
| 3,127,363 | 3/1964 | Nitzche et al. | 260/18 |
| 1,954,744 | 4/1934 | Peterson et al. | 134/41 X |
| 2,671,717 | 3/1954 | Ferguson | 134/2 X |
| 2,008,839 | 7/1935 | Samson | 134/3 UX |
| 2,878,188 | 3/1959 | Callahan | 134/3 UX |
| 2,458,661 | 1/1949 | Webster et al. | 134/3 |

OTHER PUBLICATIONS

Burns et al., Protective Coatings for Metals, pp. 22–25, 424, 425 & 427.

*Primary Examiner*—William D. Martin
*Assistant Examiner*—Harry J. Gwinnell
*Attorney*—Robert F. Fleming, Jr. et al.

[57] ABSTRACT

The adhesion to metal surfaces of room temperature vulcanizable silicone rubber curable through condensation of silicon-bonded hydroxyls with silicon-bonded alkoxy radicals is improved by contacting the metal surface with aqueous solutions of sodium ammonium or potassium salts of chlorides, iodides, bromides, bicarbonates, sulfates, dihydrogenphosphates, monohydrogenphosphates, tetraborates, perchlorates, nitrates or nitrites, rinsing the surface, drying, thereafter applying the room temperature vulcanizable silicone rubber to the treated surface and allowing it to cure.

10 Claims, No Drawings

METHOD OF ADHERING SILICONE RUBBER TO METAL SURFACES USING SALTS

This invention relates to a method of improving the adhesion of a room temperature vulcanizable silicone rubber to a metal surface.

The adhesion of silicone rubber to metal surfaces and particularly certain silicone rubbers to metal surfaces is a problem which has received considerable attention in the prior art. In 1944, a method was described in U.S. Pat. No. 2,354,011 which applied a layer of insoluble heavy metal salts of aliphatic fatty acids to metal surfaces to which an organic rubber was to be bonded. Metal salts of fatty acids usually act as release agents for silicone rubber and thus a number of other methods for adhering silicone rubber to metals have been developed. The methods known in the art to adhere silicone rubber to metal surfaces involve the application of an adhesive composition, a primer and the like, such that the silicone rubber bonds to another surface instead of a metal surface.

An object of the present invention is to bond silicone rubber, particularly room temperature vulcanizable, to metal surfaces without using an intervening layer of primer or adhesive. This object and others will become more apparent from the following detailed description of the present invention.

This invention relates to a method of improving the adhesion of room temperature vulcanizable silicone rubber to a metal surface comprising contacting a metal surface with an aqueous salt solution wherein the cation is selected from the group consisting of sodium and potassium and the anion is selected from the group consisting of chloride, bromide, iodide, bicarbonate, sulfate, dihydrogenphosphate, monohydrogenphosphate, tetraborate, perchlorate, nitrate and nitrite, rinsing the metal surface with water, drying the metal surface wherein a treated metal surface is obtained, applying to the treated metal surface a room temperature vulcanizable silicone rubber consisting essentially of a hydroxyl endblocked polydiorganosiloxane having a viscosity of from 1,000 to 100,000 cs. at 25°C. and having organic radicals selected from the group consisting of methyl, ethyl, phenyl and 3,3,3-trifluoropropyl, wherein at least 50 percent of the organic radicals are methyl radicals, an alkoxysilicon compound crosslinking agent and a curing catalyst, allowing the room temperature vulcanizable silicone rubber to cure whereby the adhesion of the room temperature vulcanizable silicone rubber to the treated metal surface is increased compared to the adhesion of the same room temperature vulcanizable silicone rubber applied to an untreated metal surface.

The adhesion of room temperature vulcanizable silicone rubber to a metal surface is improved by first contacting the metal surface with an aqueous solution of a sodium, ammonium or potassium salt. These sodium, ammonium and potassium salts are well known in the art and are readily available materials. The anions of these salts can be chloride, bromide, iodide, bicarbonate, sulfate, dihydrogenphosphate, monohydrogenphosphate, tetraborate, perchlorate, nitrate and nitrite. The salts include, sodium chloride, potassium chloride, sodium bromide, potassium bromide, sodium iodide, potassium iodide, sodium bicarbonate, potassium bicarbonate, sodium sulfate, potassium sulfate, sodium dihydrogenphosphate, potassium dihydrogenphosphate, sodium monohydrogenphosphate, potassium monohydrogenphosphate, sodium tetraborate, potassium tetraborate, sodium perchlorate, potassium perchlorate, sodium nitrate, potassium nitrate, sodium nitrate, potassium nitrite, ammonium chloride, ammonium bromide, ammonium sulfate and ammonium nitrate.

The metal surface can be metals such as iron, steel, stainless steel, aluminum, titanium, tin and alloys thereof.

The metal surface can be contacted by aqueous solutions of any of the salts or mixtures of the salts. Any method of contacting the metal surface with the salt can be used so long as an intimate contact is accomplished. The metal surface is preferably immersed in the aqueous salt solution. Other methods, which are suitable, include methods such as allowing the aqueous salt solution to pass over the metal surface, wetting a sponge or cloth with the aqueous salt solution and contacting the surface with the wet applicator and the like. The time of contact can be short such as one minute to long periods of time such as 64 hours or longer, preferably the contact time is from 1 to 24 hours. The temperature of the contacting step is not narrowly critical except that temperatures above the boiling point of the aqueous salt solution is not recommended. The temperature can conveniently be ambient temperatures. Under certain conditions solvents other than water may be suitable as a carrier for the salts, particularly the ammonium salts.

The concentration of the salt in the aqueous salt solution can vary broadly such as from 0.1 weight percent salt up to the saturation concentration. Preferably, convenient aqueous salt solutions are from 1 to 10 weight percent salt.

After the metal surface has been contacted with the aqueous salt solution for a suitable time, the metal surface is rinsed with water to remove any salt remaining on the metal surface. The method of rinsing can be immersion of the metal surface in water, water can be run over the metal surface and the like. After the metal surface is rinsed with water, the surface is dried. The drying can be done by merely allowing the metal surface to be exposed to ambient air. Other drying atmospheres can also be used such as nitrogen, a vacuum or the like. The drying can be accomplished faster by rinsing away the water with a volatile solvent such as acetone or methanol. Exposure of the metal surface to a drying atmosphere for periods of up to 10 days does not effect the ultimate adhesion of the room temperature vulcanizable silicone rubber to the metal surface.

To the treated metal surface, a room temperature vulcanizable silicone rubber is applied. The particular room temperature vulcanizable silicone rubber is limited to one which cures through the condensation of alkoxys bonded to silicone and hydroxyls bonded to silicon in the presence of a curing catalyst. These room temperature vulcanizable silicone rubbers are well known in the art and are available commercially. These room temperature vulcanizable silicone rubbers are known to possess a very low affinity for bonding to metal surfaces and therefore it is important to improve the adhesion to metal surfaces to broaden their utility. The elimination of adhesion compositions and primers can also be accomplished by treating the metal surface in accordance with this invention. Although the improvement in adhesion bond strength is not always an ultimate value, completely cohesive, sufficient enhancement of the adhesive bond strength is realized to make these room temperature vulcanizable silicone rubbers useful where adhesion to metal surfaces is needed.

The room temperature vulcanizable silicone rubbers consist essentially of a hydroxyl endblocked polydiorganosiloxane having a viscosity of from 1,000 to 100,000 cs. at 25°C., preferably from 1,000 to 50,000 cs. at 25°C. The organic radicals of the polydiorganosiloxane can be methyl, ethyl, phenyl and 3,3,3-trifluoropropyl where at least 50 percent of the organic radicals are methyl radicals. The hydroxyl endblocked polydiorganosiloxanes can be illustrated by polydimethylsiloxane, polymethyl-3,3,3-trifluoropropylsiloxane, polyethylmethylsiloxane, polydiethylsiloxane and polydiorganosiloxanes which are copolymers of two or more units of dimethylsiloxane units, diphenylsiloxane units, methylphenylsiloxane units, diethylsiloxane units and 3,3,3-trifluoropropylmethylsiloxane units. Mixtures and blends of polydiorganosiloxanes can also be used.

The crosslinking agent can be an alkoxysilicon compound which can be illustrated by orthosilicates such as ethylorthosilicate, n-propylorthosilicate, amylorthosilicate, pentenylorthosilicate, diethyldipropylorthosilicate and hexylorthosilicate; alkylpolysilicates such as methylpolysilicate, ethylpolysilicate, isopropylpolysilicate, n-propylpolysilicate, secondary amylpolysilicate and n-butylpolysilicate; mono-organotrialkoxysilanes such as methyltrimethoxysilane, ethyltriethoxysilane, propyltrimethoxysilane, methyltriisopropoxysilane, phenyltrimethoxysilane, vinyltrimethoxysilane; and other alkoxysilicon compounds such as $Si(OCH_2CH_2OCH_3)_4$, $Si(OCH_2CH_2OCH_2CH_3)_4$, $C_6H_5Si(OCH_2CH_2OCH_3)_3$, $CF_3CH_2CH_2Si(OCH_2CH_2OCH_3)_3$ and the like.

The curing catalyst can be illustrated by metal salts of carboxylic acids such as lead naphthenate, cobalt naphthenate, zinc naphthenate, sodium naphthenate, iron-2-ethylhexoate, lead 2- ethylhexoate, chromium octoate, dibutyltin dibenzoate, dibutyltin adipate, lead sebacate, dibutyltin dilactate, dibutyltindiacetate, dibutyltindilaurate, lead octoate, tin ricinoleate, cobalt hexoate, aluminum acetyl-acetonate, zirconium acetoacetate, dioctyltindimaleinate, stannous octoate and the like.

The above room temperature vulcanizable silicone rubbers are well known in the art and are available commercially. The room temperature vulcanizable silicone rubbers which comprise a hydroxyl endblocked polydiorganosiloxane, an alkoxysilicon compound and a curing catalyst are further defined in the following patents with respect to ingredients, amounts and methods of preparation. The following patents are hereby incorporated by reference and include U.S. Pat. No. 2,843,555 by Berridge, U.S. Pat. No. 2,902,467 by Chipman, U.S. Pat. No. 2,927,907 by Polmanteer, U.S. Pat. No. 3,065,194 by Nitzsche et al., U.S. Pat. No. 3,070,559 by Nitzsche et al., U.S. Pat. No. 3,070,566 by Nitzsche et al., U.S. Pat. No. 3,127,363 by Nitzsche et al. and U.S. Pat. No. 3,305,502 by Lampe. The room temperature vulcanizable silicone rubbers can also contain any of the fillers and additives which are well known and described in the prior art.

After the room temperature vulcanizable silicone rubber is applied to the treated metal surface, it is allowed to cure. Since these silicone rubbers vulcanize when mixed at room temperature additional curing procedures are not required. However, one can increase the temperature to shorten the curing time, but this is not necessary since these silicone rubbers usually set up within a few hours. After the room temperature vulcanizable silicone rubber cures, the adhesion to the metal surface is improved compared to the same silicone rubber in combination with an untreated metal surface.

The following examples are illustrative only and should not be construed as limiting the present invention which is properly delineated in the claims.

EXAMPLE 1

Aluminum panels and foil were initially cleaned by immersing and rubbing with paper wipers first under trichloroethylene and then under methyl isobutyl ketone. The cleaned aluminum substrates were allowed to dry and then immersed in the treating agent for the 16 hours and then rinsed with water. The various aqueous salt solutions used as treating agents were as defined in the Table. The rinsed aluminum substrates were allowed to dry under ambient conditions. The room temperature vulcanizable silicone rubber was applied with a spatula to the treated aluminum foil strips measuring 10 inches by 1 inch by 0.004 inch. These foil strips were applied to a treated aluminum panel (6 inches by 4 inches by 1/16 inch) having a 4 inch width with the rubber side of the foil strip to the aluminum panel and then rolled with a 10 pound hand roller to provide a thickness of 5 to 8 mils for the room temperature vulcanizable silicone rubber. The test assembly was then allowed to cure at ambient conditions 1 week before adhesion tests were made. Adhesion tests were also done on identical samples after curing for 1 month. The adhesion was determined by using conventional test equipment for the 180° peel test at 2 inches per minute jaw separation rate. The adhesion results were as shown in the Table.

The room temperature vulcanizable silicone rubber was prepared by thoroughly mixing the following ingredients: 100 parts by weight of a hydroxyl endblocked polydimethylsiloxane fluid having a viscosity of about 12,500 cs. at 25°C., 30 parts by weight of a trimethylsiloxy treated fume silica filler, 4 parts by weight of n-propylorthosilicate and 0.3 part by weight of dibutyltindiacetate.

TABLE

| Run No. | Treatment | Adhesion, Peel, Pounds Per Linear Inch | |
|---|---|---|---|
| | | After 1 week | After 1 month |
| 1. | None (Control)* | 2–5 | 2–6 |
| 2. | Water* | 6 | 7 |
| 3. | 2 weight percent $NaHCO_3$ in water | 7 | 14** |
| 4. | 2 weight percent $Na_2SO_4$ in water | 9 | 22 |
| 5. | 1 weight percent $NaH_2PO_4 \cdot H_2O$ and 1 weight percent $Na_2HPO_4$ in water | 15 | 17 |
| 6. | 2 weight percent $Na_2B_4O_7 \cdot 10 H_2O$ in water | 21 | 25 |
| 7. | 1 weight percent $KClO_4$ in water | 9 | 15 |
| 8. | 2 weight percent NaCl(0.342 M) in water | 11 | 19 |
| 9. | 2 weight percent KBr in water | 16 | 17 |
| 10. | 2 weight percent KI in water | 18 | 22 |
| 11. | 2 weight percent $KNO_3$ in water | 20 | 19 |
| 12. | 2 weight percent $NaNO_2$ in water | 17 | 22 |
| 13. | NaCl and NaI (0.342 M each) in water | 5 | 13 |
| 14. | $KNO_3$ and $Na_2SO_4$ (0.198 M each) in water | 5 | 10 |

* For comparative purposes
** 19 pli, after 8 months

That which is claimed is:

1. A method of improving the adhesion of room temperature vulcanizable silicone rubber to a metal surface consisting essentially of contacting a cleaned metal surface wherein said metal is selected from the group consisting of iron, steel, stainless steel, aluminum, titanium, tin and alloys thereof with an aqueous salt solution wherein the cation is selected from the group consisting of sodium, ammonium and potassium and the anion is selected from the group consisting of chloride, bromide, iodide, bicarbonate, sulfate, dihydrogenphosphate, monohydrogenphosphate, tetraborate, perchlorate, nitrate and nitrite, rinsing the metal surface with water, drying the metal surface wherein a treated metal surface is obtained, applying to the treated metal surface a room temperature vulcanizable silicone rubber consisting essentially of a hydroxyl endblocked polydiorganosiloxane having a viscosity of from 1,000 to 100,000 cs. at 25°C. and having organic radicals selected from the group consisting of methyl, ethyl, phenyl and 3,3,3-trifluoropropyl, wherein at least 50 percent of the organic radicals are methyl radicals, an alkoxy silicon compound crosslinking agent and a curing catalyst, allowing the room temperature vulcanizable silicone rubber to cure whereby the adhesion of the room temperature vulcanizable silicone rubber to the treated metal surface is increased compared to the adhesion of the same room temperature vulcanizable silicone rubber applied to an untreated metal surface.

2. The method in accordance with claim 1 wherein the salt is a sodium salt.

3. The method in accordance with claim 1 wherein the salt is a potassium salt.

4. The method in accordance with claim 2 wherein the sodium salt is sodium tetraborate.

5. The method in accordance with claim 2 wherein the sodium salt is a sodium nitrite.

6. The method in accordance with claim 2 wherein the sodium salt is sodium chloride.

7. The method in accordance with claim 2 wherein the sodium salt is a mixture of sodium dihydrogenphosphate and sodium monohydrogenphosphate.

8. The method in accordance with claim 3 wherein the potassium salt is potassium bromide.

9. The method in accordance with claim 3 wherein the potassium salt is potassium iodide.

10. The method in accordance with claim 3 wherein the potassium salt is potassium nitrate.

* * * * *